Patented Feb. 5, 1952

2,584,846

UNITED STATES PATENT OFFICE 2,584,846

TRIHALOETHYL ESTERS OF DIBASIC ALIPHATIC ACIDS AND THE PRODUCTION THEREOF

John W. Cusic, Skokie, and Albert L. Raymond, Northfield, Ill., assignors to G. D. Searle & Co., Skokie, Ill., a corporation of Illinois No Drawing. Application April 13, 1948,
Serial No. 20,825

12 Claims. (Cl. 260—485)

This invention relates to trihaloalkyl esters of dibasic aliphatic acids and to the preparation thereof. More particularly, it relates to compounds having the general structural formula:

wherein X is an alkylene or haloalkylene radical, R is a lower alkyl or trihaloalkyl radical, and R' is a lower trihaloalkyl radical.

In accordance with this invention, the group X of the foregoing structural formula represents bivalent hydrocarbon or halogenated hydrocarbon radicals containing from 1 to 4 carbon atoms between the ester groups COOR and COOR', and therefore includes radicals such as methylene, ethylene, propylene, trimethylene, tetramethylene, 1,2-, 2,3- and 1,3-butylene, and the amylenes and related alkylene radicals, as well as halogenated hydrocarbon radicals of the type above recited, such as chloromethylene, bromomethylene, bromoethylene, chloropropylene, and the like. While X may be substituted by one or more of the halogens, we prefer to use esters in which X carries one or two middle halogen substituents, viz., one or two chlorine and/or bromine atoms. R represents lower alkyl radicals such as alkyl radicals of 1 to 5 carbon atoms, including both straight and branched chained groups such as isopropyl, isobutyl, secondary amyl, and the like. R furthermore represents lower trihaloalkyl radicals wherein the three halogen atoms are attached to the same carbon atom, including tribromoethyl, trichloroethyl, trichoroisopropyl, tribromoisopropyl, trichloro-tertiary-butyl, and tribromo-tertiary-butyl. R' represents lower trihaloalkyl radicals of the foregoing type. R and R' can represent the same or different trihaloalkyl radicals.

The compounds to which this invention relates are high-boiling oily liquids which are only slightly soluble in water, but which are soluble in the common organic solvents and in fats and oils of animal, mineral, or vegetable nature. The substances which comprise this invention are of value as antiseptics, sedatives, and preservatives. They may be used either as the pure esters or in the form of solutions in organic solvents such as the lower alcohols, propylene glycol, the polyethylene glycols, mineral oil, and vegetable oils. It is the purpose of this invention to provide useful halogenated esters of the foregoing type. It is a further object of this invention to provide efficient methods for preparing such substances.

Our invention is disclosed in further detail by the following substances, which are typical of those within its purview.

A. Bis-trichloroethyl succinate, having the formula

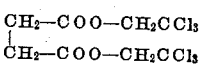

B. Trichloroethyl ethyl bromomalonate, of the formula

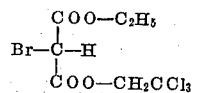

C. Tribromoethyl ethyl succinate, having the formula

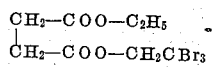

D. Bis-tribromoethyl glutarate, of the formula

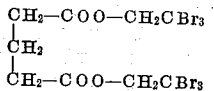

E. Tribromoethyl methyl ethylmalonate, which has the formula

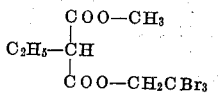

F. Trichloroethyl ethyl malonate, of the formula

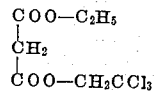

G. Bis-trichloroisopropyl succinate, of the formula

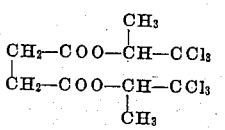

H. Bis-tribromoethyl adipate, which has the formula

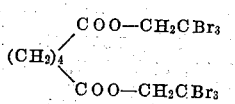

I. Trichloroethyl ethyl succinate, of the formula

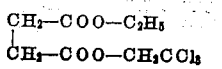

J. Bis-trichloroethyl pyrotartrate, having the formula $$\begin{array}{l} CH_2-COO-CH_2CCl_3 \\ | \\ CH_3-CH-COO-CH_2CCl_3 \end{array}$$

K. Trichloroethyl ethyl chloromalonate, which has the formula $$\begin{array}{l} COO-C_2H_5 \\ | \\ Cl-C-H \\ | \\ COO-CH_2CCl_3 \end{array}$$

L. Trichloroethyl tribromoethyl succinate, having the formula $$\begin{array}{l} CH_2-COO-CH_2CCl_3 \\ | \\ CH_2-COO-CH_2CBr_3 \end{array}$$

M. Bis-trichloroethyl α,β-diethylsuccinate, of the formula $$\begin{array}{l} C_2H_5-CH-COO-CH_2CCl_3 \\ | \\ C_2H_5-CH-COO-CH_2CCl_3 \end{array}$$

N. Tribromoisopropyl butyl α-bromo-β-chlorosuccinate, of the formula $$\begin{array}{l} Br-CH-COO-C_4H_9 \\ | \\ Cl-CH-COO-CH-CBr_3 \\ \phantom{Cl-CH-COO-CH-}| \\ \phantom{Cl-CH-COO-CH-}CH_3 \end{array}$$

The compounds of this invention are prepared by reacting an acid halide of a dibasic aliphatic acid, which may be halogen-substituted, containing 3 to 8 carbon atoms, with a trihaloalkanol in an inert solvent, or in an acid-binding solvent, or, in certain instances, in the absence of a solvent. Where it is desired that unsymmetrical esters be obtained, it is desirable to prepare a monoester of an alcohol or trihaloalkanol, by reacting an alcohol or trihaloalkanol with a dibasic acid anhydride, which may be halogen-substituted. The monoester is subsequently converted to a monoester acid halide, preferably chloride, which can be further reacted with another molecule of a different trihaloalkanol to obtain the desired unsymmetrical ester. The halogen or halogens on X can be present in the acid at the start of the synthesis or can be introduced subsequent to the formation of the ester, as by halogenation of the ester with elemental bromine or chlorine in an inert solvent such as a halogenated hydrocarbon, a saturated hydrocarbon, benzene, toluene, acetic acid, and the like. The use of sulfuryl chloride or bromide in such solvents is also suitable.

Our invention is disclosed in detail by the following examples which are provided for the purpose of illustrating specific embodiments of the invention, but which are not to be construed as limiting it in spirit or in scope. Amounts of materials are given in parts by weight.

*Example 1*

155 parts of succinyl chloride, 350 parts of trichloroethanol, and 260 parts of dimethylaniline are refluxed in 1600 parts of dry toluene for 24 hours. The cooled reaction mixture is washed with water, then with dilute hydrochloric acid, and finally with water. It is dried over calcium chloride, filtered, evaporated under reduced pressure, and the residue of bis-trichloroethyl succinate (compound A) is distilled at 160–162° centigrade at 2 millimeters pressure.

By a similar process, using 183 parts of adipyl chloride and 664 parts of tribromoethanol, there is obtained bis-tribromoethyl adipate (compound H).

*Example 2*

164 parts of β-carboethoxypropionyl chloride, 283 parts of tribromoethanol, and 120 parts of dimethylaniline are refluxed in 1200 parts of dry benzene for 35–40 hours. The cooled benzene solution is washed with dilute acid and then with water, and dried over anhydrous calcium chloride. After removal of the benzene, the residue of tribromoethyl ethyl succinate (compound C) is distilled at 176–178° C. at 12 mm. pressure.

*Example 3*

A solution of 234 parts of trichloroethanol and 190 parts of dimethylaniline in 1000 parts of dry ether is reacted with 230 parts of carboethoxyacetyl chloride, which is added dropwise with agitation. After the addition, the mixture is refluxed for 3 hours and allowed to stand for about 15 hours. The ether solution is washed with water, with dilute acid, and finally with water, and dried with anhydrous sodium sulfate. The ether is stripped off under vacuum and the residue of trichloroethyl ethyl malonate (compound F) is distilled at 90–92° C. at 0.3 mm. pressure.

*Example 4*

To 37 parts of trichloroethyl ethyl malonate in 240 parts of carbon tetrachloride are added 234 parts of bromine in 240 parts of carbon tetrachloride. After standing overnight the reaction mixture is washed with water, with dilute sodium bisulfite solution, and then with water. It is dried over calcium chloride and evaporated under vacuum. The residue of trichloroethyl ethyl bromomalonate (compound B) is distilled at 135–138° C. at 2 mm. pressure.

By a similar process to the foregoing, trichloroethyl ethyl malonate can be chlorinated in carbon tetrachloride with gaseous chlorine until one mole is absorbed. The mixture is worked up as above and affords trichloroethyl ethyl chloromalonate (compound K).

*Example 5*

250 parts of succinic anhydride are heated at 90–100° C. with 380 parts of trichloroethanol for about 3 hours, with occasional agitation. At the end of the reaction period, 600 parts of thionyl chloride are added and the mixture is warmed to 50–60° C. for about 5 hours. Then the volatile materials are removed under vacuum at 90–100° C. The residue of β-(carbotrichloroethoxy)propionyl chloride is reacted in dry benzene in the presence of 600 parts of dimethylaniline at reflux temperature for 30–40 hours with 850 parts of tribromoethanol. The cooled solution is then washed with dilute sodium bicarbonate and water and then dried. Upon removal of the solvent there is obtained trichloroethyl tribromoethyl succinate (compound L).

*Example 6*

339 parts of β-carbethoxypropionyl chloride and 296 parts of trichloroethanol are heated together at 110–115° C. for 90 hours. At the end of this time the reaction mixture is distilled under reduced pressure, and trichloroethyl ethyl succinate (compound I) is obtained, distilling at 127–129° C. at 7 mm. pressure.

We claim:
1. A halogenated ester having the formula

$$\begin{array}{l} COO-R \\ | \\ X \\ | \\ COO-R' \end{array}$$

wherein X is a member of the group consisting of halomethylene radicals and alkylene radicals containing one to four carbon atoms between the ester groupings, R is a member of the group consisting of ethyl and trihaloethyl radicals, and R' is a trihaloethyl radical.

2. A trihaloethyl ethyl ester of a dibasic aliphatic acid containing three to six carbon atoms.
3. A trihaloethyl ethyl succinate.
4. Trichloroethyl ethyl succinate.
5. A bis-trihaloethyl ester of a dibasic aliphatic acid containing three to six carbon atoms.
6. A bis-trihaloethyl succinate.
7. Bis-trichloroethyl succinate.
8. A trihaloethyl ethyl halomalonate.
9. A trichloroethyl ethyl halomalonate.
10. Trichloroethyl ethyl bromomalonate.
11. The process of producing a halogenated ester of the formula

wherein X is a member of the group consisting of alkylene radicals and haloalkylene radicals containing one to four carbon atoms between the ester groupings, R is a member of the group consisting of ethyl and trihaloethyl radicals, and R' is a trihaloethyl radical, which comprises converting an acid of the formula

R—O—CO—X—COOH wherein R and X have the foregoing meanings, to the corresponding acid halide, reacting said acid halide with a trihaloethanol, and recovering the halogenated ester so formed.

12. The process of producing trichloroethyl ethyl succinate which comprises reacting β-carbethoxypropionyl chloride with trichloroethanol and recovering the ester so formed.

JOHN W. CUSIC.
ALBERT L. RAYMOND.

REFERENCES CITED

The following references are of record in the file of this patent:

Wolffenstein, Berichte, vol. 48, p. 2043 (1915).
Wolffenstein, Arch. Exp. Path. Pharm., vol. 79, p. 334 (1916).